United States Patent
Sotokawa et al.

(10) Patent No.: US 8,652,351 B2
(45) Date of Patent: Feb. 18, 2014

(54) TITANIC ACID COMPOUND, PROCESS FOR PRODUCING THE TITANIC ACID COMPOUND, ELECTRODE ACTIVE MATERIAL CONTAINING THE TITANIC ACID COMPOUND, AND STORAGE DEVICE USING THE ELECTRODE ACTIVE MATERIAL

(75) Inventors: Tomoyuki Sotokawa, Kusatsu (JP); Nariaki Moriyama, Yokkaichi (JP); Masatoshi Honma, Yokkaichi (JP); Tokuo Suita, Kusatsu (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 784 days.

(21) Appl. No.: 12/674,965

(22) PCT Filed: Aug. 27, 2008

(86) PCT No.: PCT/JP2008/065259
§ 371 (c)(1),
(2), (4) Date: Feb. 24, 2010

(87) PCT Pub. No.: WO2009/028530
PCT Pub. Date: Mar. 5, 2009

(65) Prior Publication Data
US 2011/0073804 A1    Mar. 31, 2011

(30) Foreign Application Priority Data

Aug. 28, 2007 (JP) .................................. 2007-221311
Mar. 11, 2008 (JP) .................................. 2008-061078
Jul. 30, 2008 (JP) .................................. 2008-196692

(51) Int. Cl.
*H01M 4/02* (2006.01)
*C01G 23/04* (2006.01)
*H01M 4/48* (2010.01)

(52) U.S. Cl.
USPC .................. 252/182.1; 429/218.1; 429/231.5; 423/608

(58) Field of Classification Search
USPC ........... 252/182.1; 429/218.1, 231.5; 423/608
See application file for complete search history.

(56) References Cited

U.S. PATENT DOCUMENTS

2010/0046143 A1* 2/2010 Yoshio et al. ................. 361/502

FOREIGN PATENT DOCUMENTS

| CN | 101000960 A | 7/2007 |
|----|-------------|--------|
| JP | 0992265 | 4/1997 |

(Continued)

OTHER PUBLICATIONS

Suzuki, S.; Miyayama, M. J. Electrochem. Soc. 2007, 154, A438-A443.*

(Continued)

*Primary Examiner* — Michael Pepitone
(74) *Attorney, Agent, or Firm* — Paul E. White, Jr.; Manelli Selter PLLC (57) ABSTRACT

This invention provides a titanic acid compound-type electrode active material having a high battery capacity and, at the same time, having excellent cycle characteristics. The titanic acid compound exhibits an X-ray diffraction pattern corresponding to a bronze-type titanium dioxide except for a peak for a (200) plane and having a peak intensity ratio between the (001) plane and the (200) plane, i.e., $I_{(200)}/I_{(001)}$, of not more than 0.2. The titanic acid compound may be produced by heat dehydrating $H_2Ti_3O_7$ at a temperature in the range of 200 to 330° C., by heat dehydrating $H_2Ti_4O_9$ at a temperature in the range of 250 to 650° C., or by heat dehydrating $H_2Ti_5O_{11}$ at a temperature in the range of 200 to 600° C.

2 Claims, 2 Drawing Sheets

(56) References Cited

FOREIGN PATENT DOCUMENTS

| JP | 10-208748 A | 8/1998 |
| JP | 2007-137686 A | 8/1998 |
| JP | 11283626 | 10/1999 |
| JP | 2000 251888 | 9/2000 |
| JP | 2001 250553 | 9/2001 |
| JP | 2006-303395 A | 11/2006 |
| JP | 2007 109533 | 4/2007 |
| JP | 2008-117625 A | 5/2008 |
| JP | 2008 255000 | 10/2008 |
| WO | WO 2008047898 A1 * | 4/2008 |
| WO | WO 2008/111465 A | 9/2008 |

OTHER PUBLICATIONS

Kazutaka Chiba et al., "Soft Kagakuteki Shuho . . . to Denki Kagaku Tokusei", The Electrochemical Society of Japan, Dai 74 Kai Taikai Koen Yoshishu, Mar. 29, 2007, p. 230.

Kazutaka Chiba et al., Soft Kagakuteki Shuho . . . to Denki Kagaku Tokusei, Dai 47 Kai Battery Symposium in Japan Koen Yoshishu, Nov. 20, 2006, pp. 602-603.

T. P. Feist et al., "The Soft Chemical Synthesis . . . Titanates," J. of Solid State Chemistry, 1992, V. 101, p. 275-295.

D. J. D. Corcoran et a al., "Hydrogen titanates as potential . . . cell electrolytes," Solid State Ionics, 2000, V. 136-137, p. 297-303.

S. Yin et al., "Phase transformation of protonic . . . solvothermal conditions," J. of Materials Chemistry, 1999, V. 9, p. 1191-1195.

T. Sasaki et al., "Protonated pentatitanate: preparation, . . . cation intercalatioin," Chemistry of Materials, 1992, V. 4, No. 4, p. 894-899.

Encyclopaedia Chimica, 1963, p. 872.

Yoshikazu Suzuki et al. "Synthesis and thermal analyses of $TiO_2$-derived nanotubes prepared by the hydrothermal method," J. of Materials Research, V. 19, No. 4, pp. 982-985 Apr. 2004.

Kazutaka Chiba et al., "Soft Kagakuteki Shuho . . . to Denki Kagaku Tokusei", The Electrochemical Society of Japan, Dai 74 Kai Taikai Koen Yoshishu, Mar. 29, 2007, p. 230 English Translation; translated Mar. 23, 2013.

* cited by examiner

TITANIC ACID COMPOUND, PROCESS FOR PRODUCING THE TITANIC ACID COMPOUND, ELECTRODE ACTIVE MATERIAL CONTAINING THE TITANIC ACID COMPOUND, AND STORAGE DEVICE USING THE ELECTRODE ACTIVE MATERIAL

CROSS-REFERENCE TO RELATED APPLICATIONS

This application is the national phase of international application PCT/JP2008/065259 filed 27 Aug. 2008 which designated the U.S.

TECHNICAL FIELD

The present invention relates to a titanic acid compound having a specified crystal structure, a process for producing the titanic acid compound, an electrode active material using the titanic acid compound, and an electric storage device using the electrode active material.

BACKGROUND ART

Compounds containing at least titanium and oxygen are known to include, for example, titanic acid compounds and titanium oxides. Titanic acids are known to include orthotitanic acid represented by the composition formula of $H_4TiO_4$ and metatitanic acid represented by $H_2TiO_3$ (Non-patent Document 1). Titanium oxides are known to include titanium dioxides having a crystal structure of rutile type, anatase type or brukite type, and also a crystal structure referred to as bronze type (Non-patent Document 2) has recently been reported.

On the other hand, since lithium secondary batteries have a high energy density and excellent cycle characteristics, they have rapidly spread recently. The lithium secondary battery is generally constituted of a positive electrode composed of a transition metal compound containing lithium, a negative electrode capable of occluding and releasing lithium, and a non-aqueous electrolyte solution. Although graphite, which can provide a flat potential, has been used as a negative electrode, since the graphite has a low discharge potential, there is apprehension regarding safety for use in large-size batteries such as for hybrid automobiles (HEV applications), and titanic acid compounds, which have a discharge potential of 1.5 V, attracts attention. For example, electrochemical characteristics of titanic acid compounds such as $H_2Ti_6O_{13}$ and $H_2Ti_{12}O_{25}$ (Non-patent Document 3) and a titanium dioxide having a crystal structure of bronze type (Non-patent Document 4) are reported.

NON-PATENT DOCUMENT 1: Encyclopaedia Chimica Editorial Board, editor, "Kagaku Daijiten (Encyclopaedia Chimica) 5 (cut-down version)", 14th ed., published by Kyoritsu Shuppan Co., Ltd., Sep. 15, 1963, p. 872

NON-PATENT DOCUMENT 2: Thomas P. Feist, et al., "The soft Chemical Synthesis of TiO2(B) from Layered Titanates", Journal of Solid State Chemistry 101 (1992), 275-295

NON-PATENT DOCUMENT 3: Kazuki Chiba et al., "Synthesis of a novel titanium oxide by soft chemical means, and electrochemical characteristics thereof", Proceedings of the 74th Meeting of the Electrochemical Society of Japan, Mar. 29, 2007, Lecture No. 1H31

NON-PATENT DOCUMENT 4: Kazuki Chiba et al., "Synthesis of a layered titanium oxide by soft chemical means, and electrochemical characteristics thereof", Proceedings of the 47th Battery Symposium, Nov. 21, 2006, Lecture No. 2P-08

DISCLOSURE OF THE INVENTION

Problems to be Solved by the Invention

However, even if the titanic acid compounds described in Non-patent Documents 3 and 4 are used as an electrode active material, there are such problems that the battery capacity is insufficient, the cycle characteristics are poor, and the battery capacity largely decreases in repeated charge and discharge.

Means for Solving the Problems

As a result of exhaustive studies to solve such problems, the present inventors have found a novel titanic acid compound having a specified crystal structure, and further found that a battery using the titanic acid compound as an electrode active material exhibits a high battery capacity and excellent cycle characteristics. These findings have led to the completion of the present invention.

That is, the present invention is a titanic acid compound having an X-ray diffraction pattern equivalent to that of a bronze-type titanium dioxide except for a peak of a (200) plane and having a peak intensity ratio ($I_{(200)}/I_{(001)}$) of a (200) plane to a (001) plane of 0.2 or lower.

Advantages of the Invention

The titanic acid compound according to the present invention, if used especially as an electrode active material, provides excellent battery characteristics and particularly a high capacity and excellent cycle characteristics.

BEST MODE FOR CARRYING OUT THE INVENTION

The present invention is a titanic acid compound, and is characterized in that the titanic acid compound has an X-ray diffraction pattern equivalent to that of a bronze-type titanium dioxide except for a peak of a (200) plane and has a peak intensity ratio ($I_{(200)}/I_{(001)}$) of a (200) plane to a (001) plane of 0.2 or lower. The X-ray diffraction pattern equivalent to that of a bronze-type titanium dioxide is indicated by JCPDS cards 35-0088, 46-1237 and 46-1238. In the X-ray diffraction pattern using the Cu—Kα line as a ray source, the bronze-type titanium dioxide is observed to exhibit two peaks of a (001) plane and a (200) plane in the vicinity of a diffraction angle (2θ) of 15°, but although the titanic acid compound according to the present invention is observed to exhibit a peak of a (001) plane, a peak of a (200) plane is not substantially observed. That is, when peak intensities of a (001) plane and a (200) plane are denoted as $I_{(001)}$ and $I_{(200)}$, respectively, the intensity ratio $I_{(200)}/I_{(001)}$ is 0.2 or lower. In titanic acid compounds such as $H_4TiO_4$ (orthotitanic acid), $H_2TiO_3$ (metatitanic acid), $H_2Ti_6O_{13}$ and $H_2Ti_{12}O_{25}$, which are conventionally well-known, such X-ray diffraction patterns on a (001) plane and a (200) plane are not observed. The titanic acid compound according to the present invention is not especially limited to the composition as long as the compound is one which is composed of titanium, oxygen and hydrogen and exhibits the above-mentioned X-ray diffraction pattern, but if the composition is represented by the composition formula $H_xTi_yO_z$, the composition is preferably in the range of x/y of 0.02 to 0.40 and z/y of 2.01 to 2.30. This range easily provides the compound having such a crystal structure, and the composition is more preferably in the range of x/y of 0.02 to 0.37 and z/y of 2.01 to 2.20. The average particle diameter (a median diameter by the laser scattering method) is not especially limited, but is usually in the range of 0.05 to 10 μm, and more preferably in the range of 0.1 to 2 μm. The particle shape can assume any of isotropic shapes such as spherical and polyhedral ones, anisotropic shapes such as rod-like and plate-like ones, amorphous shapes, and the like, and is not especially limited. The specific surface area is not especially limited, but is preferably in the range of 0.1 to 50 m²/g, and more preferably in the range of 0.1 to 20 m²/g.

If the titanic acid compound according to the present invention is converted to a secondary particle obtained by aggregating primary particles, it is preferable because powder characteristics such as the flowing property, adhesion property and filling property are improved. The secondary particle in the present invention is in the state where primary particles are firmly bonded, and cannot easily be crumbled by an industrial operation such as usual mixing, disintegration, filtration, water washing, transportation, weighing, bagging or deposition, and almost remains as a secondary particle. The average particle diameter (median diameter by the laser scattering method) of the secondary particle, depending on applications, is usually preferably in the range of 0.1 to 20 μm. The specific surface area is not especially limited, but is preferably in the range of 0.1 to 100 m²/g, and more preferably in the range of 1 to 100 m²/g. The particle shape also is not limited as in the primary particle, and various shapes can be used. In the case of the use as an electrode active material as described later, the pore volume is preferably in the range of 0.005 to 1.0 cm³/g, and more preferably in the range of 0.05 to 1.0 cm³/g. The measurement method of the pore volume involves, for example, a method in which nitrogen is made adsorbed by/desorbed from a sample at a liquid nitrogen temperature (77K); a micropore volume and a micropore distribution are calculated from obtained adsorption/desorption isothermal curves by DH method; and a cumulative value of the micropore volume is defined as a pore volume.

The particle surface of the above-mentioned primary or secondary particle may be coated with at least one selected from the group consisting of carbon, inorganic compounds such as silica and alumina, and organic compounds such as a surfactant and a coupling agent. In the case of using two or more thereof, each thereof may be laminated one layer by one layer, or the particle surface may be coated with a mixture or a composite material of two or more thereof. The coating kind is suitably selected according to the purpose, but especially in the case of the use as an electrode active material, coating with carbon is preferable because of providing a good electric conductivity. The coating amount of carbon is preferably in the range of 0.05 to 10% by weight in terms of C with respect to a titanic acid compound according to the present invention in terms of $TiO_2$. The amount less than this range cannot provide a desired electric conductivity; and the amount more than the range instead decreases the characteristics. The more preferable coating amount is in the range of 0.1 to 5% by weight. The coating amount of carbon can be analyzed by CHN analysis method, the high-frequency combustion method or the like. Further, different elements other than titanium may be made to be contained in the range of not inhibiting the above-mentioned crystal form by doping or otherwise in the crystal lattice.

Then, the present invention is a process for producing a titanic acid compound having an X-ray diffraction pattern equivalent to that of a bronze-type titanium dioxide except for a peak of a (200) plane and having a peak intensity ratio ($I_{(200)}/I_{(001)}$) of a (200) plane to a (001) plane of 0.2 or lower, the process being characterized in that $H_2Ti_3O_7$ is heat dehydrated at a temperature in the range of 200 to 330° C.; or $H_2Ti_4O_9$ is heat dehydrated at a temperature in the range of 250 to 650° C.; or $H_2Ti_5O_{11}$ is heat dehydrated at a temperature in the range of 200 to 600° C. In any of $H_2Ti_3O_7$, $H_2Ti_4O_9$ and $H_2Ti_5O_{11}$, a heating temperature lower than the respective ranges does not exhibit the above-mentioned X-ray diffraction pattern of a (001) plane and a (200) plane; and a heating temperature higher than the respective ranges progresses the dehydration too much and easily generates a bronze-type titanium dioxide. With respect to the composition of a target titanic acid compound, a desired titanic acid compound can be obtained by controlling the amount of dehydration by adjusting heating conditions, for example, in whose composition x/y is in the range of 0.02 to 0.40 and z/y is in the range of 2.01 to 2.30 in the case where the composition is represented by the composition formula $H_xTi_yO_z$. The index of the dehydrated state preferably uses a loss on heat in the temperature range of 300 to 600° C. measured by a differential thermo-balance; and if the heating is carried out so that the loss on heat becomes in the range of 0.3 to 3.0% by weight, the titanic acid compound according to the present invention is easily obtained.

$H_2Ti_3O_7$, $H_2Ti_4O_9$ and $H_2Ti_5O_{11}$ to become starting materials are obtained by reacting alkali metal titanate salts represented by $M_2Ti_3O_7$, $M_2Ti_4O_9$ and $M_2Ti_5O_{11}$ (M is an alkali metal), respectively, with an acidic compound to substitute an alkali metal ion in the alkali metal titanate salt with a hydrogen ion. The alkali metal represented by M in the composition formula includes sodium, potassium and cesium; and among them, sodium and potassium are preferable because these can be industrially advantageously put in practice. Use of an inorganic acid, such as hydrochloric acid, sulfuric acid, nitric acid or hydrofluoric acid, as an acidic compound easily progresses the reaction; and hydrochloric acid and sulfuric acid are preferable because these can be industrially advantageously put in practice. The amount and the concentration of an acidic compound are not especially limited, but preferably, the amount is equal to or larger than the reaction equivalent weight of an alkali metal contained in the alkali metal titanate salt, and the concentration of a free acid is equal to or lower than 2 N. The reaction temperature is not especially limited, but the reaction is carried out preferably at a temperature in the range of less than 100° C., at which the structure of such a titanic acid compound generated hardly changes.

In the case where the titanic acid compound according to the present invention is used as an electrode active material, the content of an alkali metal to become a factor of inhibiting battery characteristics is preferably decreased as much as possible, and an alkali metal titanate salt is reacted with an acidic compound preferably so that the content of an alkali metal (M) in $H_2Ti_3O_7$, $H_2Ti_4O_9$ or $H_2Ti_5O_{11}$ obtained in the process of reacting with the acidic compound is 1.0% by weight or less in terms of M with respect to the titanic acid compound in terms of $TiO_2$. Specifically, the reaction process includes: (1) the reaction temperature with an acidic compound is 40° C. or higher; (2) the reaction with an acidic compound is repeated twice or more times; (3) after the alkali metal titanate salt is disintegrated or pulverized, or while being disintegrated or pulverized, the alkali metal titanate salt is reacted with an acidic compound; and (4) the alkali metal titanate salt is reacted with an acidic compound in the presence of trivalent titanium ions. The reaction may be carried out by a combined process of two or more thereof. In the process (1), the reaction temperature is preferably less than 100° C. as described before. The process (4) specifically includes a process in which a soluble trivalent titanium compound such as titanium trichloride is added to an acidic compound or a solution thereof, and a process in which trivalent titanium ions are made present by reducing a soluble tetravalent titanium compound such as titanyl sulfate or titanium tetrachloride. The concentration of the trivalent titanium ions in the acidic compound or the solution thereof is preferably in the range of 0.01 to 1% by weight.

The obtained $H_2Ti_3O_7$, $H_2Ti_4O_9$ or $H_2Ti_5O_{11}$ is washed as required, and solid-liquid separated, and thereafter dried. The drying is carried out preferably in the air at a temperature in the range of 50 to 150° C. Especially in the case of using $H_2Ti_3O_7$, the drying in the air at a temperature equal to or less than 100° C. makes easy the control of dehydration in the heating process thereafter, thereby easily providing a titanic acid compound according to the present invention, which is preferable.

The alkali metal titanate salt is obtained by mixing a titanium compound and an alkali metal compound in a wet system or dry system, and thereafter calcining the mixture. Titanium compounds usable are inorganic titanium compounds including titanium oxides such as titanium dioxide ($TiO_2$), titanic acid compounds such as meta titanic acid ($H_2TiO_3$) and ortho titanic acid ($H_4TiO_4$), titanium chlorides such as titanium tetrachloride, and the like, and organic titanium compounds including titanium alkoxides; and alkali metal compounds usable are carbonates, sulfates, hydroxides and the like of an alkali metal. Among them, a titanium oxide and/or a titanic acid compound, and a carbonate of an alkali metal are preferably used. The titanium oxide and the titanic acid compound may be crystalline or amorphous; and in the case where these are crystalline, the crystal form may be rutile type, anatase type, brukite type, or the like, and is not especially limited. The calcination temperature is preferably in the range of 600 to 1,000° C. A calcination temperature lower than this range hardly progresses the reaction; and that higher than the range easily generates sintering of the products. The more preferable range is 700 to 900° C. In order to promote the reaction and suppress sintering of the products, the calcination may be repeated twice or more times. For the calcination, a well-known calcination oven can be used, such as a fluidized oven, stationary oven, a rotary kiln or a tunnel kiln. The calcination atmosphere can suitably be selected from in the air and a non-oxidative atmosphere. The calcination apparatus is suitably selected depending on the calcination temperature and the like. After the calcination, disintegration or pulverization may be carried out depending on the degree of sintering, or in order to decrease the content of an alkali metal as described before. The disintegration or pulverization may be carried out in a dry system using an impact crusher such as a hammer mill, a pin mill or a centrifugal crusher, a grinding crusher such as a roller mill, a compression crusher such as a roll crusher or a jaw crusher, an airflow crusher such as a jet mill, or the like, or in a wet system using a sand mill, a ball mill, a pot mill or the like.

The production process according to the present invention may be provided with a process of obtaining a secondary particle (hereinafter, referred to as granulation). The process involves, for example, (1) granulation before $H_2Ti_3O_7$, $H_2Ti_4O_9$ or $H_2Ti_5O_{11}$ is heat dehydrated, or (2) granulation after $H_2Ti_3O_7$, $H_2Ti_4O_9$ or $H_2Ti_5O_{11}$ is heat dehydrated to make a titanic acid compound according to the present invention. The granulation includes dry granulation, stirring granulation and compaction granulation, and the dry granulation is preferable because the pore volume of the secondary particle is easily regulated. The dry granulation involves a process in which a slurry containing compounds concerned or starting materials thereof is dried and pulverized after the slurry is dehydrated, in which the slurry is molded and dried after the slurry is dehydrated, or in which the slurry is spray dried. Above all, the spray drying is preferable, which can easily control the secondary particle diameter, the particle shape and the pore volume. In the process (1), processes usable for obtaining a granulated material such as $H_2Ti_3O_7$, $H_2Ti_4O_9$ or $H_2Ti_5O_{11}$ include (A) a process in which granulation is made when a slurry containing $H_2Ti_3O_7$, $H_2Ti_4O_9$ or $H_2Ti_5O_{11}$ is dried, and also (B) a process in which a granulated material of $M_2Ti_3O_7$, $M_2Ti_4O_9$ or $M_2Ti_5O_{11}$ (M is an alkali metal) and an acidic compound are reacted. A granulated material of an alkali metal titanate salt used in the process (B) is obtained (a) by drying and granulating a slurry containing a titanium compound and an alkali metal compound, and thereafter calcining the granulated material, or (b) by drying and granulating a slurry containing the alkali metal titanate salt.

The spray drier used in spray drying may suitably be selected from a disk type, a pressure nozzle type, two-fluid nozzle type, four-fluid nozzle type ones and the like depending on the property of the slurry and the processing capability of the drier. The control of the particle diameter may be made by controlling the size of liquid droplets sprayed, for example, by regulating the solid content concentration of the slurry, and in the case of the disk type drier, by regulating the rotation frequency of the disk, and in the cases of a pressure nozzle type, a two-fluid nozzle type and a four-fluid nozzle type drier and the like, by regulating the spray pressure and the nozzle diameter, and otherwise. With respect to the drying temperature, preferably, the inlet temperature is in the range of 150 to 250° C., and the outlet temperature is in the range of 70 to 120° C. After the spray drying, an obtained granulated material may be further heat treated at a higher temperature than the spray drying temperature to regulate the pore volume.

If the granulation is carried out in the presence of the organic binder, for example, by adding an organic binder to a slurry containing the compounds described above or starting materials thereof, and drying and granulating the mixture, and the organic binder is removed from the obtained granulated material, it is more preferable because the pore volume is more easily controlled. The processes to remove an organic binder include (a) a process in which a granulated material containing an organic binder is heat treated, and (b) a process in which it is washed, and the process (a), which does not generate a waste liquid, is industrially preferable. The organic binder can suitably be selected from well-known compounds permitting to be removed according to removal means. The addition amount of an organic binder is preferably in the range of 0.1 to 20% by weight, and more preferably in the range of 0.5 to 10% by weight, with respect to a titanium oxide in terms of $TiO_2$.

In the case of applying the process (a) to the removal of an organic binder, if a granulated material is that of an alkali metal titanate salt, the heating temperature is preferably in the range of 250 to 800° C., and more preferably in the range of 400 to 700° C. If a granulated material is that of $H_2Ti_3O_7$, the heat treatment needs to be carried out in the range of 200 to 330° C. so that the granulated material is hardly converted to a bronze-type titanium dioxide; if a granulated material of $H_2Ti_4O_9$, in the range of 250 to 650° C.; and if a granulated material of $H_2Ti_5O_{11}$, in the range of 200 to 600° C. Further, the kind of a binder permitting to be decomposed and removed by the heat treatment in this temperature range needs to be selected. The organic binders to be used include, for example, (1) vinylic compounds (polyvinyl alcohol, polyvinylpyrrolidone, and the like), (2) cellulosic compounds (hydroxyethylcellulose, carboxymethylcellulose, methylcellulose, ethylcellulose, and the like), (3) proteinic compounds (gelatin, gum arabic, casein, sodium caseinate, ammonium caseinate, and the like), (4) acrylate compounds (sodium polyacrylate, ammonium polyacrylate, and the like), (5) natural polymeric compounds (starch, dextrin, agar, sodium alginate, and the like), and (6) synthetic polymeric compounds (polyethylene glycol, and the like). At least one selected from these can be used. Above all, compounds containing no inorganic component such as sodium are more preferable because they are easily decomposed and volatilized by the heat treatment.

Further, the production process according to the present invention may comprise a step of coating with at least one selected from the group consisting of carbon, inorganic compounds and organic compounds on the surface of the titanic acid compound according to the present invention. The coating process may be provided at any stage in the production process according to the present invention. The stages specifically include (1) a stage where a mixture of a titanium compound and an alkali metal compound is calcined, or after granulated, calcined, (2) a stage where an obtained alkali metal titanate salt represented by $M_2Ti_3O_7$, $M_2Ti_4O_9$ or $M_2Ti_5O_{11}$ (M is an alkali metal) or a granulated material thereof is reacted with an acidic compound, (3) a stage where $H_2Ti_3O_7$, $H_2Ti_4O_9$ or $H_2Ti_5O_{11}$ obtained or a granulated material thereof is heated, and (4) a stage after a primary particle or a secondary particle of the titanic acid compound according to the present invention is obtained. The coating can be carried out at least at one stage selected from these stages.

The coating with carbon is carried out, for example, by adding a carbon-containing material at one of the stages described above and heating the resultant. The heating of the carbon-containing material may be carried out at any of the stages (1), (2) and (4), excluding the stage (3), which is carried out in a liquid phase. The heating temperature of a carbon-containing material is preferably in the range of 150 to 1,000° C.; and the heating atmosphere can suitably be selected from the air, a non-oxidative atmosphere and the like, but is preferably a non-oxidative atmosphere. The addition of a carbon-containing material may be carried out at any stage of the stages (1) to (4) as long as it is before the heating. In the case where a carbon material is added at the stage (1), a titanium compound and an alkali metal are mixed with the carbon-containing material, and heated at a temperature in the range of 600 to 1,000° C., which is preferable because the heating of the carbon-containing material and the generation of an alkali metal titanate salt can simultaneously be carried out. The more preferable calcination temperature is in the range of 700 to 900° C. Since an obtained alkali metal titanate salt or a granulated material thereof is coated with carbon, the material is supplied to the (2) and successive stages. In the case where a carbon-containing material is added at the stage (2), the carbon-containing material is added when the reaction with an acidic compound is carried out, and the resultant is supplied to the successive stage to heat the carbon-containing material. In the case where a carbon-containing material is added at the stage (3), heating the carbon-containing material and $H_2Ti_3O_7$, $H_2Ti_4O_9$ or $H_2Ti_5O_{11}$, or a granulated material thereof at a corresponding predetermined temperature can simultaneously carry out the heating of the carbon-containing material and the generation of the titanic acid compound according to the present invention. The heating temperature for $H_2Ti_3O_7$ or a granulated material thereof is preferably in the range of 200 to 330° C.; that for $H_2Ti_4O_9$ or a granulated material thereof is preferably in the range of 250 to 650° C.; and that for $H_2Ti_5O_{11}$ or a granulated material thereof is preferably in the range of 200 to 600° C. In the case where a carbon-containing material is added at the stage (4), the carbon-containing material is added to an obtained primary particle or secondary particle, and the mixture can be heated after the mixing or under mixing. The heating temperature is preferably lower than 200° C. so that the dehydration hardly progresses.

The carbon-containing materials include carbon black, acetylene black, Ketjen Black, and thermal decomposition products of organic compounds. In the case of using thermal decomposition products of an organic compound, coating with carbon may be carried out while the organic compound are added and heated at any stage as described before and this generates the thermal decomposition products, or the organic compound may be heated to generate the thermal decomposition products in advance and then these products may be used. The organic compound may be used in a solid or liquid state as it is, or in a gasified state. The kind of an organic compound to be used can suitably be selected, but if it is used for an electrode active material, it is preferably a hydrocarbon compound in which components other than carbon hardly remain and/or an oxygen-containing hydrocarbon compound. The hydrocarbon compounds include, for example, (A) alkane compounds (methane, ethane, propane, and the like), (B) alkene compounds (ethylene, propylene, and the like), (C) alkyne compounds (acetylene, and the like), and (D) cycloalkane compounds (cyclohexane, and the like), and (E) aromatic compounds (benzene, toluene, xylene, and the like). The oxygen-containing hydrocarbon compounds include, for example, (A) alcoholic compounds ((a) monohydric alcohols (methanol, ethanol, propanol, and the like), (b) dihydric alcohols (ethylene glycol, and the like), (c) trihydric alcohols (trimethylolethane, trimethylolpropane, and the like), (d) polyalcohols (polyvinyl alcohol, and the like), and the like), (B) etheric compounds ((a) ether monomers (diethyl ether, ethyl methyl ether, and the like)), (b) polyethers (polyethylene glycol, polyethylene oxide, polypropylene ether, and the like), and the like), (C)carboxylic compounds ((a) oxycarboxylic acids (citric acid, malic acid, and the like), (b) monocarboxylic acids (acetic acid, formic acid, and the like), (c) dicarboxylic acids (oxalic acid, malonic acid, and the like), (d) aromatic carboxylic acids (benzoic acid, and the like), and the like), (D) aldehyde compounds (formaldehyde, acetaldehyde, and the like), (E) phenolic compounds (phenol, catechol, pyrogallol, and the like), and (F) saccharides (glucose, sucrose, cellulose, and the like), and the like. In order to obtain a secondary particle having a surface coated with carbon, as an organic compound, selection of a compound to become a binder such as a polyalcohol or a polyether brings about the easy control of the pore volume, which is preferable.

In the case of coating with an inorganic compound, since if the coating is carried out at the stage (1), an obtained primary or secondary particle is easily doped with the component of the inorganic compound, the coating is carried out preferably at one of the stages (2) to (4). Specifically, in the case of the stage (2), the alkali metal titanate salt or a granulated material thereof; in the case of the stage (3), $H_2Ti_3O_7$, $H_2Ti_4O_9$ or $H_2Ti_5O_{11}$, or a granulated material thereof; or in the case of the stage (4), the primary or secondary particle, is dispersed in an aqueous medium liquid or the like to make a slurry; and an inorganic compound or a starting material thereof is added to the slurry, and the mixture is neutralized and thereafter solid-liquid separated, and dried as required. After the coating is carried out at the stage (2) or (3), the resultant material is fed successively to processes thereafter. If the coating with the organic compound is carried out at one of the stages (1) to (3), since the organic compound is liable to be decomposed in the calcination and the heating carried out in the post-stage processes, the coating is carried out preferably at the stage (4); for example, the coating can be carried out by mixing the organic compound and the obtained primary or secondary particle using a stirrer or a crusher. Especially in the case of coating with a coupling agent, preferably, after the coupling agent is added in a slurry of the primary or secondary particle, and hydrolyzed, the solid-liquid separation is carried out.

After the titanic acid compound according to the present invention is obtained, it may be again made into a slurry, cleaned of impurities, classified, solid-liquid separated, and dried. Alternatively, depending on the degree of aggregation of particles, the titanic acid compound may be disintegrated in the range of not impairing the advantage of the present invention by using a well-known apparatus, according to the purposes of adjusting the particle distribution and the like. In the present invention, an operation in which an external force is imparted to a primary particle, or an operation in which after an external force is imparted to a granulated material, the granulated material remains almost as it is, is referred to as "disintegration". On the other hand, an operation in which an external force is imparted to a granulated material to separate the granulated material into single particles is referred to as "pulverization".

The present invention is an electrode active material, and is characterized by containing a titanic acid compound having an X-ray diffraction pattern equivalent to that of a bronze-type titanium dioxide except for a peak of a (200) plane and having a peak intensity ratio ($I_{(200)}/I_{(001)}$) of a (200) plane to a (001) plane of 0.2 at highest, as described before. Use of the electrode active material according to the present invention can provide a lithium battery excellent in cycle characteristics and having a high battery capacity. The cause is not yet clear, but it is believed because the titanic acid compound according to the present invention has a higher crystallinity than conventional titanic acid compounds, and the diffusion path of lithium ions is easily secured. Further, since the electrode active material according to the present invention is excellent in rate characteristics, it can be used as a material for a capacitor. In the case of the use as an electrode active material, if it is represented by the composition formula $H_xTi_yO_z$, the composition is preferably in the range of x/y of 0.02 to 0.40 and z/y of 2.01 to 2.30, and more preferably in the range of x/y of 0.02 to 0.37 and z/y of 2.01 to 2.20, as described before.

Use of the secondary particle as an electrode active material can provide a lithium battery excellent in cycle characteristics, which is more preferable. The shape of the secondary particle used as an electrode active material is advantageously a shape having the lowest possible anisotropy, preferably an isotropic shape, and more preferably a spherical shape, from the viewpoint of battery characteristics.

For the purposes of improvement and the like of battery characteristics, the electrode active material according to the present invention may contain further a different electrode active material. Such a different electrode active material includes lithium titanate of spinel type, and titanium dioxide of rutile type, anatase type, brukite type, bronze type, hollandite type, ramsdellite type or the like, and one or two or more selected therefrom can be used. Such a different electrode active material may be mixed with the electrode active material according to the present invention, may be applied onto the surface of a titanic acid compound, or may be granulated with the electrode active material according to the present invention to make a secondary particle. In the case of using two or more different electrode active materials, they may be previously made into a mixture or a granulated material, or another one or more electrode active materials may be applied onto the surface of an electrode active material. The surface of the different electrode active material may be coated with carbon, an inorganic compound such as silica or alumina, an organic compound such as a surfactant or a coupling agent and the like, or may be doped with a different element. Among the different electrode active materials, especially spinel-type lithium titanate is preferable, and use of this for a negative electrode active material is more preferable. The formulation amount of a different electrode active material is preferably in the range of 0.05 to 3 in as is weight ratio with respect to 1 of the electrode active material according to the present invention.

Further, the present invention is an electric storage device, and is characterized by using the above-mentioned electrode active material. The electric storage device specifically includes a lithium battery, a capacitor and the like; these are composed of such as an electrode, a counter electrode, a separator, and an electrolyte solution; and the electrode is obtained by adding a conductive material such as carbon black and a binder such as a fluororesin to the electrode active material, and suitably molding or applying the mixture. In the case of a lithium battery, the electrode active material can be used as a positive electrode; and metal lithium, a lithium alloy, or a carbonaceous material such as graphite, or the like can be used as a counter electrode. Alternatively, the electrode active material can be used as a negative electrode; and a lithium•transition metal composite oxide such as lithium manganate, lithium cobaltate, lithium nickelate or lithium vanadate, or an olivine type compound such as lithium phosphate, or the like can be used as a positive electrode. In the case of a capacitor, it can be an asymmetric type capacitor using the electrode active material and graphite. As the separator, a porous polyethylene film and the like are used for either; as the electrolyte solution, a material in common use can be used, such as a solution in which a lithium salt such as $LiPF_6$, $LiClO_4$, $LiCF_3SO_3$, $LiN(CF_3SO_2)_2$ or $LiBF_4$ is dissolved in a solvent such as propylene carbonate, ethylene carbonate or 1,2-dimethoxyethane.

EXAMPLES

Hereinafter, Examples of the present invention will be described, but the present invention is not limited thereto.

Example 1

20.0 g of a commercially available rutile-type high-purity titanium dioxide (PT-301, made by Ishihara Sangyo Kaisha Ltd.) and 8.85 g of sodium carbonate were homogeneously mixed. The mixture was heated and calcined in the air at a temperature of 800° C. for 20 hours using an electric furnace. After the heating and calcination, the resultant was cooled, well mixed, and again heated and calcined under the same conditions to obtain $Na_2Ti_3O_7$. The obtained $Na_2Ti_3O_7$ was added to a hydrochloric acid aqueous solution of 1 mol in concentration so that the concentration of $Na_2Ti_3O_7$ became 10 g/L, and allowed to react at room temperature for 4 days under stirring to obtain $H_2Ti_3O_7$. There, during the 4 days, the solid content was made to precipitate and the hydrochloric acid aqueous solution was replaced at every day. The obtained $H_2Ti_3O_7$ was filtered, washed, and dried in the air at a temperature of 60° C. for 12 hours, and thereafter heat dehydrated in the air at a temperature of 260° C. for 20 hours using an electric furnace to obtain a titanic acid compound according to the present invention (Sample A).

Sample A was measured for a loss on heat in the temperature range of 300 to 600° C. using a differential thermobalance, and the result was 1.0% by weight.

Examples 2 to 4

Titanic acid compounds according to the present invention was obtained (Examples 2 and 3: Samples B and C) as in Example 1, except for altering the heating temperature in Example 1 to 300° C. or 320° C.

A titanic acid compound according to the present invention was obtained (Example 4: Sample D) as in Example 1, except for setting the heating temperature at 290° C. and the heating time at 5 hours.

The losses on heat thereof in the temperature range of 300 to 600° C. were 0.8% by weight, 0.7% by weight and 1.8% by weight, respectively.

Example 5

5,638 g of an aqueous slurry containing 282.0 g in terms of $TiO_2$ of orthotitanic acid and 124.7 g of sodium carbonate was spray dried under the conditions of an inlet temperature of 200° C. and an outlet temperature of 70 to 90° C. using a spray drier (Model: MDL-050C, made by Fujisaki Electric Co., Ltd.) to obtain a dried granulated material. The obtained dried granulated material was heated and calcined in the air at a temperature of 800° C. for 20 hours using an electric furnace. After the heating and calcination, the resultant was cooled, well mixed, and again heated and calcined under the same conditions to obtain a granulated material of $Na_2Ti_3O_7$. The obtained granulated material of $Na_2Ti_3O_7$ was added to a hydrochloric acid aqueous solution of 1 mol in concentration so that the concentration of $Na_2Ti_3O_7$ became 10 g/L, and allowed to react at room temperature for 4 days under stirring to obtain a granulated material of $H_2Ti_3O_7$. There, during the 4 days, the solid content was made to precipitate and the hydrochloric acid aqueous solution was replaced at every day. The obtained granulated material of $H_2Ti_3O_7$ was filtered, washed, and dried in the air at a temperature of 60° C. for 12 hours, and thereafter heat dehydrated in the air at a temperature of 300° C. for 20 hours using an electric furnace to obtain a titanic acid compound composed of a secondary particle according to the present invention (Sample E).

Sample E was measured for a loss on heat in the temperature range of 300 to 600° C. using a differential thermobalance, and the result was 0.9% by weight.

Example 6

A titanic acid compound composed of a secondary particle according to the present invention was obtained (Sample F) as in Example 5, except for altering the temperature and the time for the heat dehydration of $H_2Ti_3O_7$ in Example 5 to a temperature of 260° C. and a time of 5 hours.

Sample F was measured for a loss on heat in the temperature range of 300 to 600° C. using a differential thermobalance, and the result was 2.0% by weight.

Example 7

20.0 g of a commercially available rutile-type high-purity titanium dioxide (PT-301, made by Ishihara Sangyo Kaisha Ltd.) and 9.89 g of potassium carbonate were homogeneously mixed. The mixture was heated and calcined in the air at a temperature of 800° C. for 20 hours using an electric furnace. After the heating and calcination, the resultant was cooled, well mixed, and again heated and calcined under the same conditions to obtain $K_2Ti_4O_9$. The obtained $K_2Ti_4O_9$ was added to a hydrochloric acid aqueous solution of 1 mol in concentration so that the concentration of $K_2Ti_4O_9$ became 10 g/L, and allowed to react at room temperature for 4 days under stirring to obtain $H_2Ti_4O_9$. There, during the 4 days, the solid content was made to precipitate and the hydrochloric acid aqueous solution was replaced at every day. The obtained $H_2Ti_4O_9$ was filtered, washed, and dried in the air at a temperature of 60° C. for 12 hours, and thereafter heat dehydrated in the air at a temperature of 400° C. for 5 hours using an electric furnace to obtain a titanic acid compound according to the present invention (Sample G).

Sample G was measured for a loss on heat in the temperature range of 300 to 600° C. using a differential thermobalance, and the result was 0.39% by weight.

Example 8

A titanic acid compound composed of a secondary particle coated with carbon according to the present invention was obtained (Sample H) as in Example 5, except for using 94.1 g of sodium hydroxide in place of 124.7 g of sodium carbonate in Example 5, adding 28.2 g of a polyethylene glycol to the aqueous slurry therein, and carrying out the calcination in a nitrogen atmosphere.

Sample H was measured for a loss on heat in the temperature range of 300 to 600° C. using a differential thermobalance, and the result was 1.4% by weight. The carbon content was analyzed, and the result was 0.8% by weight in terms of C with respect to the titanic acid compound in terms of $TiO_2$.

Example 9

A titanic acid compound composed of a secondary particle coated with carbon according to the present invention was obtained (Sample I) as in Example 8, except for altering the temperature and the time for the heating of the granulated material of $H_2Ti_3O_7$ in Example 8 to a temperature of 260° C. and a time of 5 hours.

Sample I was measured for a loss on heat in the temperature range of 300 to 600° C. using a differential thermo-balance, and the result was 2.4% by weight. The carbon content was analyzed, and the result was 0.88% by weight in terms of C with respect to the titanic acid compound in terms of $TiO_2$.

Example 10

5,000 g of an aqueous slurry containing 250.0 g in terms of $TiO_2$ of orthotitanic acid, 100.1 g of potassium hydroxide and 25.0 g of a polyethylene glycol as a binder was spray dried under the conditions of an inlet temperature of 200° C. and an outlet temperature of 70 to 90° C. using a spray drier (Model: MDL-050C, made by Fujisaki Electric Co., Ltd.) to obtain a dried granulated material. The dried granulated material was heated and calcined in the air at a temperature of 750° C. for 5 hours using an electric furnace. After the heating and calcination, the resultant was cooled, well mixed, and again heated and calcined under the same conditions to obtain a granulated material of $K_2Ti_4O_9$. The obtained granulated material of $K_2Ti_4O_9$ was added to a hydrochloric acid aqueous solution of 1 mol in concentration so that the concentration of $K_2Ti_4O_9$ became 10 g/L, and allowed to react at room temperature for 4 days under stirring to obtain a granulated material of $H_2Ti_4O_9$. There, during the 4 days, the solid content was made to precipitate and the hydrochloric acid aqueous solution was replaced at every day. The obtained granulated material of $H_2Ti_4O_9$ was filtered, washed, and dried in the air at a temperature of 60° C. for 12 hours, and thereafter heat dehydrated in the air at a temperature of 300° C. for 5 hours using an electric furnace to obtain a titanic acid compound composed of a secondary particle according to the present invention (Sample J).

Sample J was measured for a loss on heat in the temperature range of 300 to 600° C. using a differential thermobalance, and the result was 1.9% by weight. The carbon content was analyzed, and the result was 0.0% by weight in terms of C with respect to the titanic acid compound in terms of $TiO_2$, that is, carbon was not contained.

Example 11

4,949 g of an aqueous slurry containing 247.6 g in terms of $TiO_2$ of orthotitanic acid, and 224.4 g of cesium carbonate was spray dried under the conditions of an inlet temperature of 200° C. and an outlet temperature of 70 to 90° C. using a spray drier (Model: MDL-050C, made by Fujisaki Electric Co., Ltd.) to obtain a dried granulated material. The obtained dried granulated material was heated and calcined in the air at a temperature of 700° C. for 5 hours using an electric furnace. After the heating and calcination, the resultant was cooled, well mixed, and again heated and calcined at a temperature of 900° C. to obtain a granulated material of $Cs_2Ti_5O_{11}$. The obtained granulated material of $Cs_2Ti_5O_{11}$ was added to a hydrochloric acid aqueous solution of 1 mol in concentration so that the concentration of $Cs_2Ti_5O_{11}$ became 10 g/L, and allowed to react at room temperature for 4 days to obtain a granulated material of $H_2Ti_5O_{11}$. There, during the 4 days, the solid content was made to precipitate and the hydrochloric acid aqueous solution was replaced at every day. The obtained granulated material of $H_2Ti_5O_{11}$ was filtered, washed, and dried in the air at a temperature of 60° C. for 12 hours, and thereafter heat dehydrated in the air at a temperature of 400° C. for 5 hours using an electric furnace to obtain a titanic acid compound composed of a secondary particle according to the present invention (Sample K).

Sample K was measured for a loss on heat in the temperature range of 300 to 600° C. using a differential thermobalance, and the result was 0.64% by weight.

Example 12

14,242 g of an aqueous slurry containing 1,000 g of a commercially available rutile-type high-purity titanium dioxide (PT-301, made by Ishihara Sangyo Kaisha Ltd.) and 442 g of sodium carbonate was spray dried under the conditions of an inlet temperature of 200° C. and an outlet temperature of 70 to 90° C. using a spray drier (Model: MDL-050C, made by Fujisaki Electric Co., Ltd.) to obtain a dried granulated material. The obtained dried granulated material was heated and calcined in the air at a temperature of 800° C. for 10 hours using an electric furnace. After the heating and calcination, the resultant was cooled, well mixed, and again heated and calcined under the same conditions to obtain a granulated material of $Na_2Ti_3O_7$. 100 g of the obtained granulated material of $Na_2Ti_3O_7$ and 5.4 g of a titanium trichloride aqueous solution of 22% in concentration were added to 355 mL of a sulfuric acid aqueous solution of 14.5% in concentration, and after the atmosphere was made a non-oxidative atmosphere using nitrogen gas, were allowed to react at a temperature of 60° C. for 5 hours, and thereafter filtered, washed, and dried in the air at a temperature of 100° C. for 12 hours to obtain a granulated material of $H_2Ti_3O_7$ (Sample l). In this Example, the replacement of the sulfuric acid aqueous solution was not carried out. Thereafter, Sample l was heat dehydrated in the air at a temperature of 290° C. for 5 hours using an electric furnace to obtain a titanic acid compound composed of a secondary particle according to the present invention (Sample L).

Sample L was measured for a loss on heat in the temperature range of 300 to 600° C. using a differential thermobalance, and the result was 1.6% by weight.

Example 13

Sample l obtained in Example 12 was disintegrated using a centrifugal crusher (Model: ZM-100, made by Nihonseiki Kaisha Ltd.), using a mesh of 2 mm in screen diameter at a rotation frequency of 14,000 rpm. 50 g of the obtained disintegrated product again with 1 g of a titanium trichloride aqueous solution of 22% in concentration was added to 220 mL of a sulfuric acid aqueous solution of 5% in concentration, and after the atmosphere was made a non-oxidative atmosphere using nitrogen gas, was allowed to react at a temperature of 70° C. for 5 hours, and thereafter filtered, washed, solid-liquid separated, and dried in the air at a temperature of 100° C. for 12 hours to obtain a granulated material of $H_2Ti_3O_7$ (Sample m). Thereafter, Sample m was heat dehydrated in the air at a temperature of 290° C. for 5 hours using an electric furnace to obtain a titanic acid compound according to the present invention (Sample M).

Sample M was measured for a loss on heat in the temperature range of 300 to 600° C. using a differential thermobalance, and the result was 1.8% by weight.

Example 14

90 g of the granulated material of $Na_2Ti_3O_7$ obtained in Example 12 and 4.8 g of a titanium trichloride aqueous solution of 22% in concentration were added to 320 mL of a sulfuric acid aqueous solution of 14.5% in concentration. The mixture was charged in a pot mill of 1 L in internal volume; 350 mL of titania beads of 1.6 mm$\phi$ as a pulverizing medium was added thereto; while the pot mill was rotated at 50 rpm, the granulated material was pulverized to single particles of $Na_2Ti_3O_7$ and simultaneously allowed to react at room temperature over 5 hours, and thereafter filtered, washed, solid-liquid separated, and dried in the air at a temperature of 100° C. for 12 hours to obtain $H_2Ti_3O_7$ (Sample n). Thereafter, Sample n was heat dehydrated in the air at a temperature of 290° C. for 5 hours using an electric furnace to obtain a titanic acid compound according to the present invention (Sample N).

Sample N was measured for a loss on heat in the temperature range of 300 to 600° C. using a differential thermobalance, and the result was 1.6% by weight.

Example 15

The titanic acid compound (Sample D) obtained in Example 4 and a commercially available spinel-type lithium titanate (XA-106, Ishihara Sangyo Kaisha Ltd.) were mixed in as is 1:1 in weight ratio to obtain an electrode active material according to the present invention (Sample O).

Comparative Example 1

A titanic acid compound (Sample P) as a comparative object was obtained as in Example 1, except for altering the temperature and the time for the heat dehydration of $H_2Ti_3O_7$ in Example 1 to a temperature of 350° C. and a time of 20 hours.

Sample P was measured for a loss on heat in the temperature range of 300 to 600° C. using a differential thermo-balance, and the result was 0.5% by weight.

Comparative Example 2

$H_2Ti_3O_7$ after the solid-liquid separation and the drying in Example 1 was used as a titanic acid compound (Sample Q) as a comparative object. Sample Q was measured for a loss on heat in the temperature range of 300 to 600° C. using a differential thermo-balance, and the result was 6.5% by weight.

Comparative Example 3

A titanic acid compound (Sample R) as a comparative object was obtained as in Example 7, except for altering the temperature and the time for the heat dehydration of $H_2Ti_4O_9$ in Example 7 to a temperature of 200° C. and a time of 5 hours. Since the heat dehydration temperature of Sample R was low, the loss on heat was measured in the range of 25 to 600° C. The loss on heat in the temperature range was measured using a differential thermo-balance, and the result was 6.62% by weight.

Evaluation 1: Compositions and Measurements of X-Ray Diffractions

Figure 1:
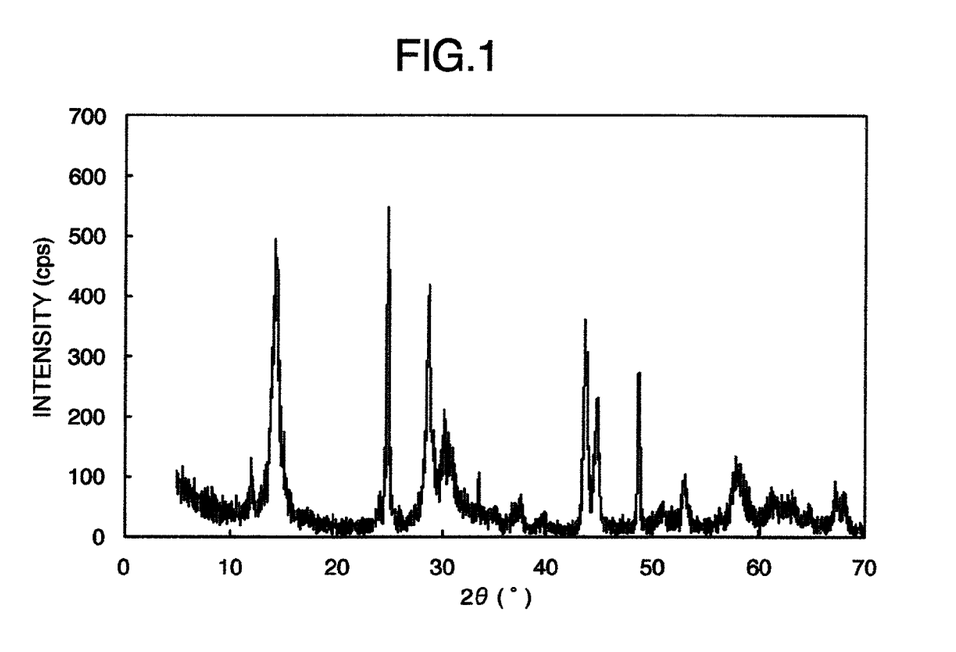
FIG. 1 is an X-ray diffraction chart of Sample A (Example 1)
Figure 2:
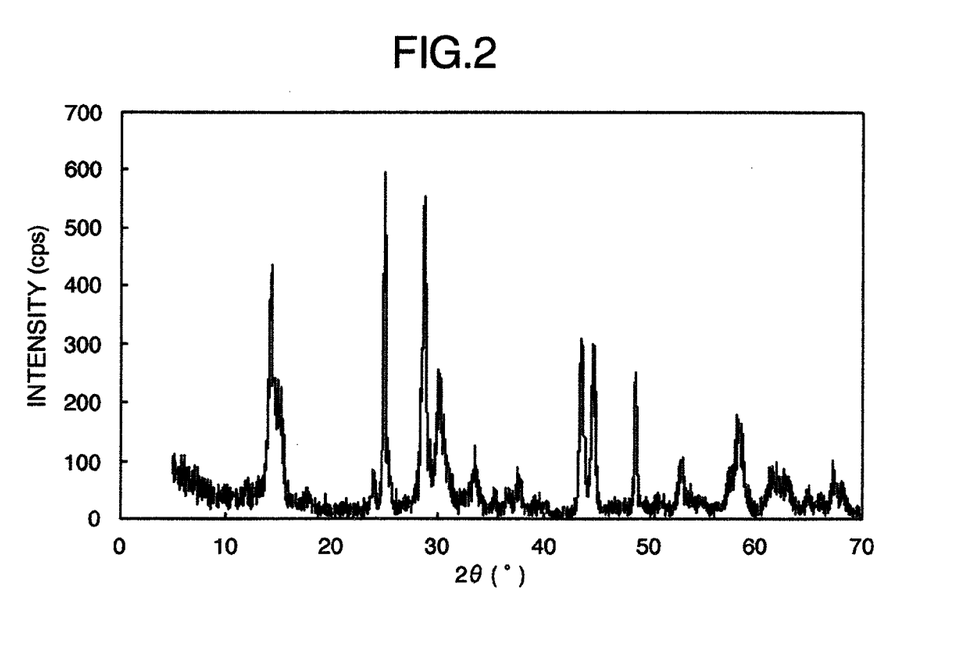
FIG. 2 is an X-ray diffraction chart of Sample P (Comparative Example 1)
Figure 3:
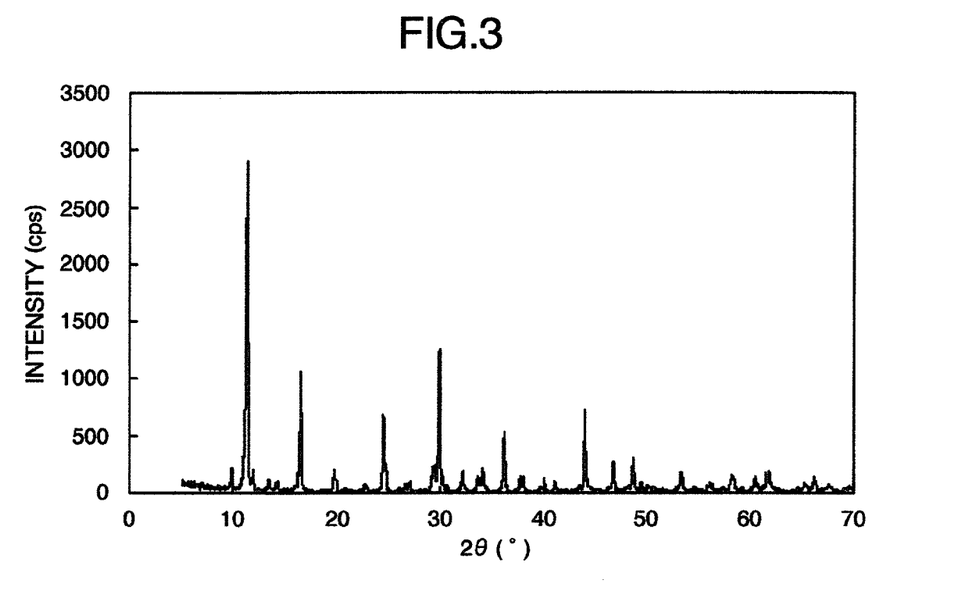
FIG. 3 is an X-ray diffraction chart of Sample Q (Comparative Example 2)

The powder X-ray diffractions (X ray: Cu-Kα) of the titanic acid compounds (Samples A to R) obtained in Examples 1 to 14 and Comparative Examples 1 to 3 were measured. From the X-ray diffraction charts, peak intensities of the (001) plane and the (200) plane were measured. The results are shown in Table 1. X-ray diffraction charts of Samples A, Q and R are shown in FIGS. 1 to 3. It is clear that the titanic acid compounds according to the present invention is equivalent to a bronze-type titanium dioxide in the X-ray diffraction pattern, but the peak intensity ratio $(I_{(200)}/I_{(001)})$ of a (200) plane to a (001) plane is 0.2 or lower. Here, x, y and z in the composition formula $H_xTi_yO_z$ shown in Table 2 are calculated, assuming that the loss on heat all comes from crystal water ($H_2O$).

Evaluation 2: Measurements of Specific Surface Areas

The specific surface areas of the titanic acid compounds (Samples A to N and P to R) obtained in Examples 1 to 14 and Comparative Examples 1 to 3 were measured by BET method using a specific surface area analyzer (Monosorb, made by Yuasa-Ionics Co., Ltd.). The results are shown in Table 1.

TABLE 1

| Sample | | Composition Formula | x/y | z/y | $I_{(200)}/I_{(001)}$ | Specific Surface Area ($m^2/g$) |
|---|---|---|---|---|---|---|
| Example 1 | A | $H_2Ti_{22}O_{45}$ | 0.09 | 2.05 | 0.00 | 4.8 |
| Example 2 | B | $H_2Ti_{25}O_{51}$ | 0.08 | 2.04 | 0.09 | 4.8 |
| Example 3 | C | $H_2Ti_{32}O_{65}$ | 0.06 | 2.03 | 0.11 | 4.8 |
| Example 4 | D | $H_2Ti_{12}O_{25}$ | 0.17 | 2.08 | 0.00 | 4.6 |
| Example 5 | E | $H_2Ti_{25}O_{51}$ | 0.08 | 2.04 | 0.00 | 6.3 |
| Example 6 | F | $H_2Ti_{11}O_{23}$ | 0.18 | 2.09 | 0.00 | 6.4 |
| Example 7 | G | $H_2Ti_{5.5}O_{12}$ | 0.36 | 2.16 | 0.00 | 10.8 |
| Example 8 | H | $H_2Ti_{16}O_{33}$ | 0.06 | 2.06 | 0.00 | 17.0 |
| Example 9 | I | $H_2Ti_9O_{19}$ | 0.22 | 2.11 | 0.00 | 21.5 |
| Example 10 | J | $H_2Ti_{11}O_{23}$ | 0.18 | 2.09 | 0.00 | 25.3 |
| Example 11 | K | $H_2Ti_{35}O_{71}$ | 0.06 | 2.03 | 0.00 | 20.0 |
| Example 12 | L | $H_2Ti_{14}O_{29}$ | 0.14 | 2.07 | 0.00 | 4.9 |
| Example 13 | M | $H_2Ti_{12}O_{25}$ | 0.17 | 2.08 | 0.00 | 5.7 |
| Example 14 | N | $H_2Ti_{14}O_{29}$ | 0.14 | 2.07 | 0.00 | 7.8 |

TABLE 1-continued

| Sample | | Composition Formula | x/y | z/y | $I_{(200)}/I_{(001)}$ | Specific Surface Area ($m^2/g$) |
|---|---|---|---|---|---|---|
| Comparative Example 1 | P | $H_2Ti_{45}O_{91}$ | 0.04 | 2.02 | 0.46 | 4.8 |
| Comparative Example 2 | Q | $H_2Ti_3O_7$ | 0.66 | 2.33 | Note | 4.7 |
| Comparative Example 3 | R | $H_2Ti_8O_{17}$ | 0.25 | 2.13 | Note | 11.1 |

Note)
X-ray diffraction patterns were different from those of the titanic acid compounds according to the present invention and well-known bronze-type titanium dioxide.

Evaluation 3: Evaluation of the Contents of Alkali Metals

The titanic acid compounds (Samples l to n) obtained in Examples 12 to 14 were analyzed for the contents of sodium and titanium; and the content of sodium and the substitutional rate of sodium contained in sodium titanate as a starting material were calculated from these analytical values. The results are shown in Table 2.

TABLE 2

| | Sample | Na Content (% by weight) | Na Substitutional Rate (%) |
|---|---|---|---|
| Example 12 | l | 0.88 | 95.0 |
| Example 13 | m | 0.18 | 99.3 |
| Example 14 | n | 0.77 | 97.1 |

Evaluation 4: Evaluation of Charge/Discharge (1) Characteristics

Lithium secondary batteries were prepared using the titanic acid compounds (Samples A to C, E to J and P to R) obtained in Examples 1 to 3 and 5 to 10 and Comparative Examples 1 to 3 as the electrode active material, and evaluated for their charge/discharge characteristics. Forms of the batteries and measurement conditions will be described.

Each Sample described above, an acetylene black powder as a conductive agent and a polytetrafluoroethylene resin as a binder were mixed in a weight ratio of 5:4:1, kneaded together in a mortar, and molded to 10 mm-diameter circular pellets. The weight of the pellets was 10 mg. An aluminum-made mesh cut into 10 mm diameter was overlapped on the pellet, and pressed at 9 MPa to make a working electrode.

The working electrode was vacuum dried at a temperature of 100° C. for 4 hours, and then incorporated in a sealable coin-type evaluation cell as a positive electrode in a glove box of −70° C. or lower in dew point. The evaluation cell used was made of a material of stainless steel (SUS316), and was of 20 mm in outer diameter and 3.2 mm in height. A negative electrode used was obtained by forming metal lithium of 0.5 mm in thickness into a circle of 12 mm in diameter. A non-aqueous electrolyte solution used was a mixed solution of ethylene carbonate and dimethyl carbonate (mixed in 1:2 in volume ratio) in which $LiPF_6$ was dissolved at a concentration of 1 mol/L.

The working electrode was placed on a lower can of the evaluation cell; a porous polypropylene film as a separator was placed thereon; and the non-aqueous electrolyte solution was dropped thereon. Further thereon, the negative electrode and a 0.5 mm thick spacer for thickness adjustment and a spring (either was made of SUS316) were mounted; an upper can equipped with a propylene-made gasket was covered; and the outer peripheral portion was caulked to seal the cell.

The measurement of the charge/discharge capacity was set in the voltage range of 1.0 to 2.5V at a charge/discharge current of 0.2 mA, and carried out at a constant current. The charge/discharge capacities at the 2nd cycle and the 30th cycle were measured; and (discharge capacity at the 30th cycle/discharge capacity at the 2nd cycle)×100 was defined as cycle characteristics. The larger value thereof means excellent cycle characteristics. The results are shown in Table 3. It is clear that the electrode active material according to the present invention has excellent cycle characteristics and a large charge/discharge capacity.

TABLE 3

| Example | Sample | 2nd Cycle | | 30th cycle | | Cycle Characteristics |
| | | Charge Capacity (mAh/g) | Discharge Capacity (mAh/g) | Charge Capacity (mAh/g) | Discharge Capacity (mAh/g) | |
|---|---|---|---|---|---|---|
| Example 1 | A | 204 | 213 | 209 | 210 | 98.7 |
| Example 2 | B | 187 | 198 | 173 | 175 | 88.1 |
| Example 3 | C | 182 | 193 | 163 | 164 | 85.0 |
| Example 5 | E | 158 | 166 | 166 | 167 | 101 |
| Example 6 | F | 156 | 164 | 160 | 162 | 98.4 |
| Example 7 | G | 191 | 200 | 190 | 192 | 95.9 |
| Example 8 | H | 205 | 182 | 209 | 175 | 96.1 |
| Example 9 | I | 176 | 187 | 176 | 177 | 94.4 |
| Example 10 | J | 211 | 221 | 216 | 217 | 98.6 |
| Example 11 | K | 212 | 221 | 210 | 211 | 95.5 |
| Comparative Example 1 | P | 133 | 146 | 105 | 105 | 72.1 |
| Comparative Example 2 | Q | 154 | 173 | 132 | 133 | 77.0 |
| Comparative Example 3 | R | 156 | 166 | 153 | 154 | 92.8 |

Evaluation 5: Evaluation of Rate Characteristics (1)

Figure 4:
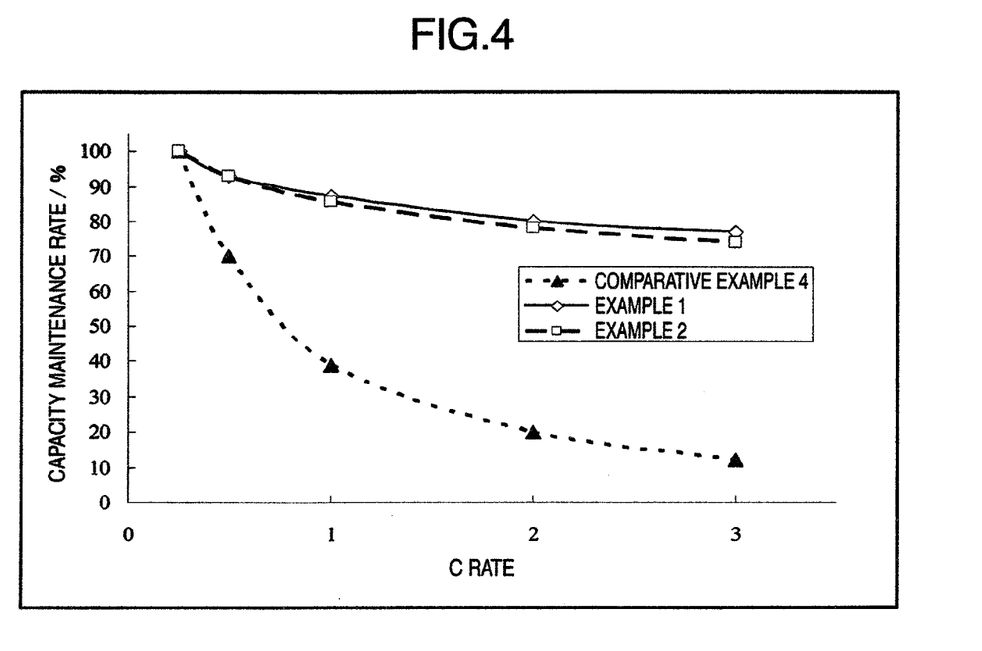
FIG. 4 is measurement results of rate characteristics of Samples A, B and S (Examples 1 and 2 and Comparative Example 4).

The titanic acid compounds (Samples A, B and E to J) obtained in Examples 1, 2 and 5 to 10, and a commercially available anatase-type titanium dioxide (ST-41, made by Ishihara Sangyo Kaisha Ltd., set as Comparative Example 4 (Sample S)) as a comparative object were used the electrode active material. The electrode active material, an acetylene black powder as a conductive agent, and a polyfluorovinilidene resin as a binder were mixed in 10:1:1 in weight ratio to prepare a paste. The paste was applied on an aluminum foil, dried at a temperature of 120° C. for 15 min, and thereafter punched out into a circle of 12 mm in diameter, and pressed at 14.7 MPa to make a working electrode. After the working electrode was vacuum dried at a temperature of 120° C. for 4 hours, a lithium secondary battery was fabricated as in Evaluation 3; and the discharge capacities were measured at various current quantities, and the capacity maintenance rates (%) were calculated. The measurement was carried out by setting the voltage range at 1.0 to 2.5 V for Samples A, B and E to J, and at 1.5 to 2.5 V for Sample S, the charge current at 40 mA/g, and the discharge current in the range of 0.25 to 10 C. The capacity maintenance rates, where a measurement value of a discharge capacity at 0.25 C was denoted as $X_{0.25}$, and measurement values in the range of 0.5 C to 10 C were denoted as $X_n$, were calculated by the expression: $(X_n/X_{0.25}) \times 100$. Here, 1 C means a current value by which the full charge can be carried out in 1 hour, and in the present evaluation, 160 mA/g corresponds to 1 C. The results are shown in Table 4 and FIG. 4. It is clear that the electrode active material according to the present invention has a high capacity maintenance rate and excellent rate characteristics even if the current quantity is made large.

TABLE 4

| Sample | Capacity Maintenance Rate (%) | | | | | | |
| | 0.25 C | 0.5 C | 1 C | 2 C | 3 C | 5 C | 10 C |
|---|---|---|---|---|---|---|---|
| Example 1 | A | 100 | 93 | 88 | 80 | 77 | 65 | 49 |
| Example 2 | B | 100 | 93 | 85 | 79 | 74 | 72 | 58 |
| Example 5 | E | 104 | 92 | 84 | 77 | 72 | 65 | 52 |

TABLE 4-continued

| Sample | Capacity Maintenance Rate (%) | | | | | | |
| | 0.25 C | 0.5 C | 1 C | 2 C | 3 C | 5 C | 10 C |
|---|---|---|---|---|---|---|---|
| Example 6 | F | 102 | 92 | 84 | 77 | 72 | 63 | 50 |
| Example 7 | G | 100 | 93 | 86 | 80 | 77 | 70 | 59 |
| Example 8 | H | 100 | 95 | 87 | 79 | 74 | 66 | 54 |
| Example 9 | I | 100 | 94 | 86 | 78 | 74 | 67 | 55 |
| Example 10 | J | 100 | 94 | 89 | 80 | 72 | 61 | 42 |
| Comparative Example 4 | S | 100 | 70 | 39 | 20 | 12 | 10 | 5 |

Evaluation 6: Evaluation of Charge/Discharge (2) Characteristics and Rate Characteristics Lithium secondary batteries were prepared as in Evaluations 4 and 5, using the titanic acid compound (Sample D) obtained in Example 4 as an electrode active material, and the electrode active material (Sample O) obtained in Example 15, and a commercially available spinel-type lithium titanate (set as Comparative Example 5 (Sample T)) used in Example 15 as a comparative object; and charge/discharge characteristics and rate characteristics were evaluated under the same conditions, except for measuring the discharge capacity at 0.25 C to 30 C. The results are shown in Table 5. It is clear that an electrode active material obtained by mixing a titanic acid compound according to the present invention and a lithium compound exhibits a large charge/discharge capacity, and excellent cycle characteristics and rate characteristics.

TABLE 5

| | Sample | Charge Capacity (mAh/g) 2nd Cycle | 30th Cycle | Cycle Characteristic | Capacity Maintenance Rate (%) 0.25 C | 0.5 C | 1 C | 2 C | 3 C | 5 C | 10 C | 20 C | 30 C |
|---|---|---|---|---|---|---|---|---|---|---|---|---|---|
| Example 4 | D | 204.2 | 200.7 | 98.3 | 100 | 94 | 88 | 83 | 78 | 71 | 59 | 39 | 38 |
| Example 15 | O | 192.2 | 189.6 | 98.6 | 100 | 97 | 93 | 90 | 88 | 86 | 81 | 73 | 65 |
| Comparative Example 5 | T | 174.6 | 171.4 | 98.2 | 100 | 100 | 100 | 99 | 98 | 96 | 92 | 87 | 82 |

INDUSTRIAL APPLICABILITY

The titanic acid compound according to the present invention is useful as an electrode active material, a photocatalyst, a catalyst, an ultraviolet absorbent, and the like. The electrode active material according to the present invention is useful for a lithium battery excellent in cycle characteristics.

The invention claimed is:

1. A titanic acid compound having an X-ray diffraction pattern equivalent to that of a bronze titanium dioxide except for a peak of a (200) plane and having a peak intensity ratio ($I_{(200)}/I_{(001)}$) of a (200) plane to a (001) plane of 0.2 or lower, and comprising primary particles having a surface of a primary particle coated with carbon, and having a composition formula $H_xTi_yO_z$ wherein x/y has a range of 0.02 to 0.40 and z/y has a range of 2.01 to 2.30.

2. The titanic acid compound according to claim 1, comprising a secondary particle comprising aggregated primary particles.

* * * * *